(12) United States Patent
Bagherzadeh

(10) Patent No.: US 10,140,658 B1
(45) Date of Patent: Nov. 27, 2018

(54) COMMODITY BACKED VIRTUAL CURRENCY METHOD AND SYSTEM FOR NETWORK TRANSACTIONS

(71) Applicant: Mehran Bagherzadeh, Vancouver (CA)

(72) Inventor: Mehran Bagherzadeh, Vancouver (CA)

( * ) Notice: Subject to any disclaimer, the term of this patent is extended or adjusted under 35 U.S.C. 154(b) by 533 days.

(21) Appl. No.: 14/300,204

(22) Filed: Jun. 9, 2014

Related U.S. Application Data

(60) Provisional application No. 61/832,408, filed on Jun. 7, 2013.

(51) Int. Cl.
*G06Q 40/00* (2012.01)
*G06Q 40/04* (2012.01)
*G06Q 20/10* (2012.01)
*G06Q 40/02* (2012.01)

(52) U.S. Cl.
CPC ........... *G06Q 40/04* (2013.01); *G06Q 20/102* (2013.01); *G06Q 40/02* (2013.01)

(58) Field of Classification Search
CPC .............................. G06Q 30/08; G06Q 40/00

USPC ...................................................... 705/35, 39
See application file for complete search history.

(56) References Cited

U.S. PATENT DOCUMENTS

2013/0218753 A1* 8/2013 Oikonomidis ......... G06Q 20/22 705/39

* cited by examiner

*Primary Examiner* — Ojo O Oyebisi
(74) *Attorney, Agent, or Firm* — Law Office of Rodney LeRoy

(57) ABSTRACT

A computerized method for managing a user account includes receiving a transfer of funds into a user account, and purchasing a commodity or valuable asset to back the funds. The method further includes tracking a value of the commodity or valuable asset, and increasing or decreasing a value of the funds based on the value of the commodity or valuable asset. The user account is accessible via a computer network for making purchases or an additional transfer of the funds to another user account. The commodity may be gold, silver, or platinum bullion. The valuable asset may be a stock or bond.

23 Claims, 3 Drawing Sheets

COMMODITY BACKED VIRTUAL CURRENCY METHOD AND SYSTEM FOR NETWORK TRANSACTIONS

CROSS REFERENCE TO RELATED APPLICATIONS

This application claims the benefit of U.S. Provisional Patent Application No. 61/832,408, filed Jun. 7, 2013, titled "Commodity Backed Virtual Currency Method and System For Network Transactions", of Mehran Bagherzadeh, and is incorporated by reference herein in its entirety.

DESCRIPTION

Background of the Invention

Embodiments of the present invention generally relate to user accounts managed by an account server where the user accounts may be used for fund transfers and purchases over a network, such as the Internet. More particularly, the present invention relates to user accounts where funds, such as virtual currency, held in the user accounts are backed by a commodity, such as gold bullion, or by another valuable asset.

Virtual currency is a type of unregulated, digital money, which is issued and usually controlled by the developers of the virtual currency. Virtual currency is typically used and accepted among members of a specific virtual community that agree to use the virtual currency in transactions. More specifically, virtual currency is often used as a medium of exchange that operates like a currency in some environments, but does not have all the attributes of real currency, which is sometimes referred to as legal tender. Characteristics of a real currency, such as physical paper money and physical coins act as legal tender that is backed by a government entity and circulates in society in a customarily as is understood by the members of the society. The distinguishing attribute of virtual currency is that virtual currency does not have the status as legal tender.

Virtual currencies have been viewed and used as a form of electronic money of payment system technology that is used for exchanges across communication networks, such as the Internet. Virtual currency has been adopted for use extensively in the on-line gaming community where players exchange virtual currency as in integral part of a game of chance and strategy, such as on-line casino type gaming and on-line power. The acceptance and success of various forms of virtual currency has driven various companies, such as brick and mortar companies and companies with network storefronts, to begin accepting virtual currency.

Various developments continue to be made to virtual currency and methods for using virtual currency.

BRIEF SUMMARY OF THE INVENTION

Embodiments of the present invention generally relate to user accounts managed by an account server where the virtual currency in the user accounts is backed by a commodity, such as gold.

According to one embodiment, a computerized method for managing a user account includes receiving a transfer of funds into the user account, and purchasing a commodity to back the funds. The method includes tracking a value of the commodity, and increasing or decreasing a value of the funds based on the value of the commodity. The user account is accessible via a computer network for making purchases or an additional transfer of the funds to another user account.

According to a specific embodiment, the commodity is gold, such as gold bullion. The commodity may alternatively be silver bullion, platinum bullion, or the like. Bullion may include coins or the like. The method may further include managing the funds via a currency server that is remotely accessible by a user computing device where the funds are indexed in the user account by the currency server. The other user account may be a merchant account of a merchant. The funds may be held in the user account in legal tender or as virtual funds where the funds transferred into the user account as legal tender are converted to the virtual funds.

According to another embodiment, a non-transitory computer-readable storage medium comprising instructions for managing funds in a user account, wherein the instructions, when executed, are for controlling a computing device to be configured for: receiving a transfer of funds into the user account; purchasing a commodity to back the funds; tracking a value of the commodity; and increasing or decreasing a value of the funds based on the value of the commodity. The user account is accessible via a computer network for making purchases or an additional transfer of the funds to another user account.

According to another embodiment, a computing device for managing a user account includes a processor; and a computer-readable storage medium comprises instructions for controlling the processor to be configured for: receiving a transfer of funds into the user account; purchasing a commodity to back the funds; tracking a value of the commodity; and increasing or decreasing a value of the funds based on the value of the commodity, wherein the user account is accessible via a computer network for making purchases or an additional transfer of the funds to another user account.

The following detailed description and accompanying drawings provide a better understanding of the nature and advantages of the present invention.

DETAILED DESCRIPTION

Embodiments of the present invention provide a method, a system, and a computer program product for electronic purchases and electronic transfer of virtual currency where the virtual currency for the purchases and the transfers are backed by a commodity, such as gold, or by another valuable asset.

Figure 1:
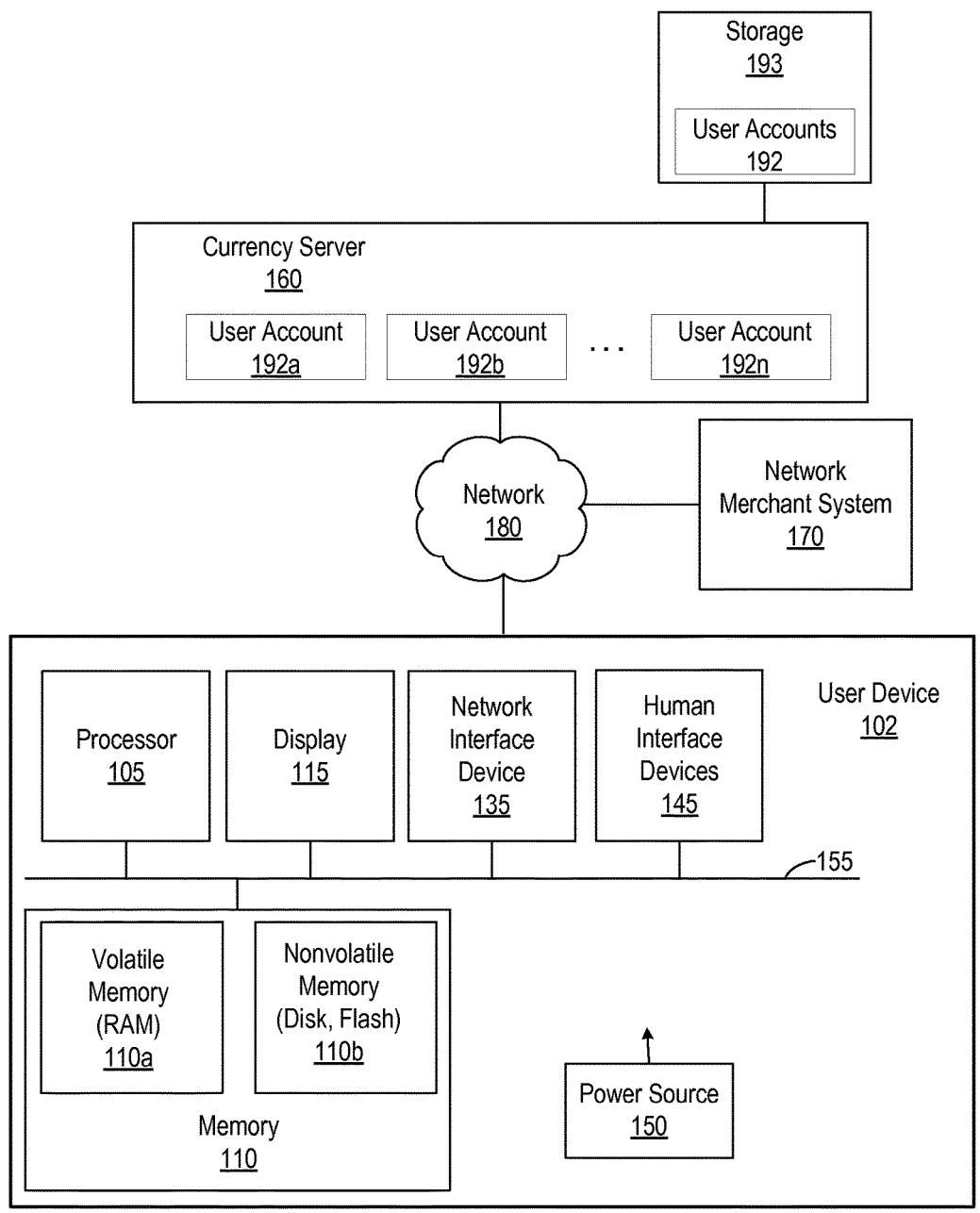
FIG. 1 is a simplified schematic of an electronic system for managing a user account that holds the virtual currency of a user according to one embodiment.

FIG. 1 is a simplified schematic of a virtual currency computing system 100 according to one embodiment. Virtual currency computing system 100 includes a user device 102, a currency server 160, a network merchant system 170, and a network 180. Virtual currency computing system 100 may be a distributed system where components of the virtual currency computing system are remotely distributed. For example, one or more user device 102, one or more currency servers 160, and one or more network merchant systems 170 might be distributed nationally or internationally.

User device 102 may include one or more of a variety of types of devices on which (i) an electronic purchases can be made over network 180 from merchant system 170, (ii) on which peer-to-peer transactions between two user devices 102 proceed, or (iii) on which an electronic funds transfer can be initiated between one or more user accounts 192a, 192b . . . 192n (collectively user accounts 192). User accounts are sometimes referred to herein as virtual wallets. While the user accounts are shown in FIG. 1 as being stored in the server or the server's external storage 193, the user accounts may be stored in the user devices according to one embodiment. According to an alternative embodiment, copies of the user accounts are stored in the user devices.

User device 102 may be a computer (e.g., a desktop computer, a laptop computer, a tablet computer, or other type of device), a mobile device (such as a mobile phone (e.g., a smart phone), a tablet computer, a mobile device dedicated to game play or configured to perform additional functions, such as smart phone functions), a gaming console, or the like. This list of user devices is not exclusive and embodiments of the present invention may include other user devices.

User device 102 may include a processor 105, a memory 110, a display 115 (integrated or separate), a network interface device 135, one or more human interface devices 145, and a power source 150. Different implementations of user device 102 may include any number of the listed components, in any combination or configuration, and may include other components not shown.

The foregoing listed components of user device 102 may be linked together via a bus 155, which may be the system bus architecture of user device 102. Although this figure shows one bus that connects the components, the busing is illustrative of any interconnection scheme serving to link these components or other components included in user device 102 subsystems.

Processor 105 may include a microprocessor, a microcontroller, control logic, a multi-core processor, or the like. Processor 105 may include one or more of these processing elements in any combination. Memory 110 may include a variety of memories, such as a volatile memory 110a (e.g., a RAM), a non-volatile memory 110b (e.g., a disk, Flash, PROM, etc.). Non-volatile memories are sometimes referred to as non-transitory memories. One or more non-transitory memories of user device 102 may store computer code for making electronic purchases, for monitoring one or more of user accounts 192, for transferring electronic funds between the user accounts, or the like. Power source 150 can be an AC source, a battery power source, such as a disposable battery, or both.

Network interface device 135 may include one or more of a variety of wired or wireless interfaces configured to communicate via a variety of communication protocols with one or more external devices (e.g., the currency server, other user devices, the network merchant system, or other types of devices) via one or more external networks 180. Network 180 may include the Internet, intranets, home networks, personal networks, a wire or wireless router, or the like.

Currency server 160 is a computing device that may include substantially the same components as user device 102 and may be substantially similarly configured to user device 102. For example, currency server 160 may include a processor 105, a network interface device 135, a memory 110, a network interface device 115, a power source 150, and a bus 155. In some embodiments, currency server 160 includes a display 115 and one or more human interface devices 145. Currency server 160 may, however, be configured to operate a server operating system. The currency server 160 shown in FIG. 1 and described herein may be a number of currency servers that operate interdependently or independently. A number of currency servers may be located in a server farm, located in one or more server farms domestically or internationally.

Currency server 160 may be configured to host user accounts 192, which may be password protected accounts of users, such as users who might access their user accounts via one or more user devices 102. The user accounts 192 may reside on a variety of types of storage devices, such as one or more external storage devices 193, and may be retrieved in whole or in part into local memory for use by the currency server.

Figure 2:
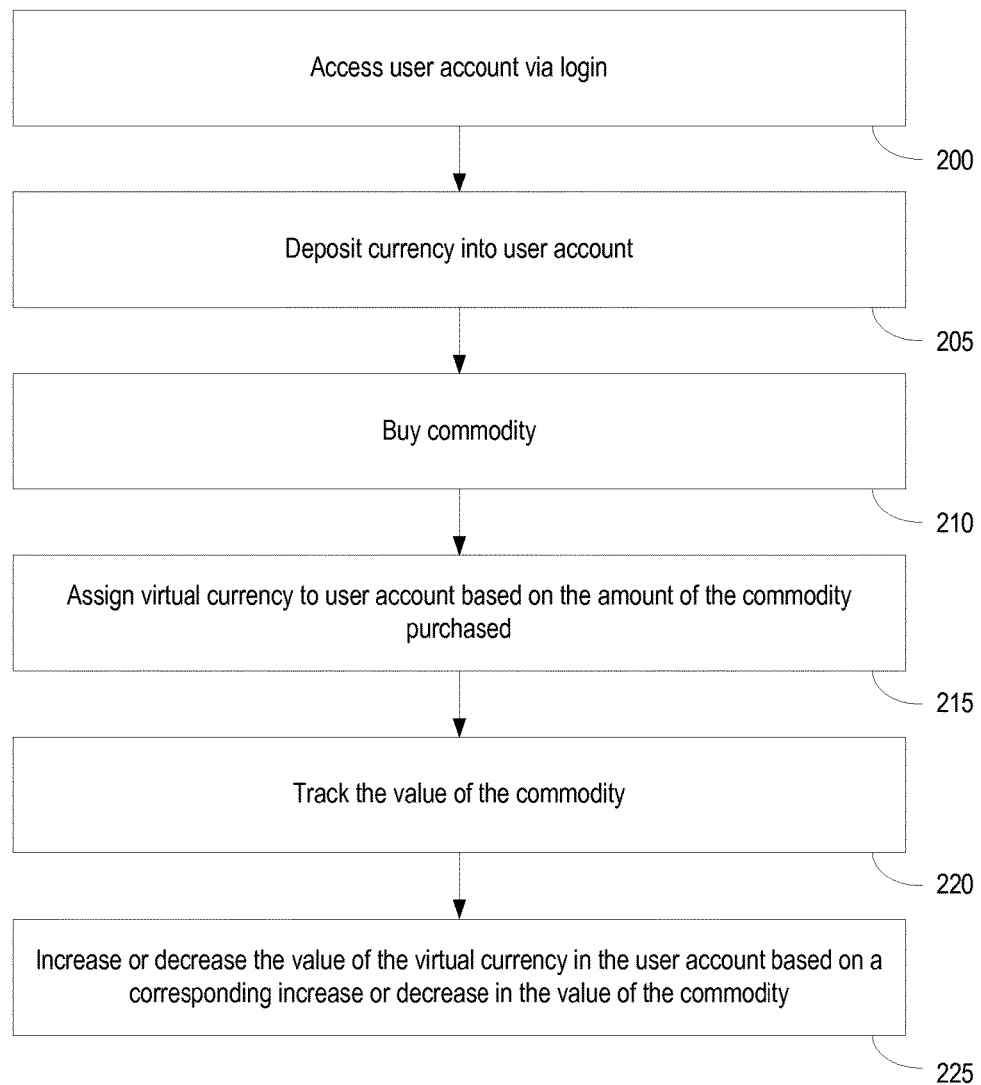
FIG. 2 is a high-level flow diagram of a method for a acquiring an amount of virtual currently that is backed by a commodity.

FIG. 2 is a high-level flow diagram of a method for a acquiring an amount of virtual currently that is backed by a commodity. The high-level flow diagram represents an example embodiment, and is not limiting on the claims. Alternative embodiments may include more or fewer steps, or may include combined steps.

According to one embodiment, a user account 192 is accessed via a user device 102, such as by electronic login via network 180, step 200. That is, a user might access her user account via login from user device 102 across network 180 to currency server 160. In some embodiment, the currency server serves web pages to the user device where the web pages are associated with one or more steps of the method. In alternative embodiments, the user device may have a computer program or application stored on the user device that provides one or more user interfaces for the steps of the method, and the user device communicates via network 180 to communicate various information of the method to the currency server, and the currency server similarly communicates various information of the method to the user device.

Each user account of each user may accept the receipt of funds from users, such as via electronic transfer of the electronic funds into the user accounts, step 205. Electronic funds may be transferred into a user account via a bank account (e.g., via a debit card, credit card, saving account, checking account, or the like) provided by a bank that provides for such electronic transfer, a credit card company that provides for electronic transfers, a brokerage account provided by a brokerage firm that provides for such electronic transfers, or the like. Funds may also be transferred into user accounts via cash, checks, or the like via a storefront, mail in, or the like. Funds may be transferred into a user account in a legal tender, such as US dollars, Canadian dollars, or the like. The funds may be held in the user accounts in the legal tender, or may be used to purchase virtual currency (i.e., the legal tender is converted to the virtual currency) that are used by the user accounts and by virtual currency computing system 100.

Subsequent to the receipt of legal tender into a user account, currency server 160 may buy a commodity that backs the legal tender, step 210. For example, the commodity may buy gold, silver, platinum, or other precious metals that back the legal tender. According to one embodiment, currency server 160 buys bullion, such as gold bullion, which is held at a secure location. Gold bullion as referred to herein includes coins, such as gold coins, silver coins, platinum coins, or the like. Currency server 160 might be configured to buy other commodities or other valuable assets, such as stocks, bonds, intangible assets, or the like.

According to one embodiment, the currency server is configured to assign an amount of virtual funds to the user's user account based on a value of the commodity purchased by the currency server (step 215). The currency server may debit the user account by an amount (e.g., a relatively small fee, such as 2 percent or less) for the commodity purchased.

Thereafter, currency server 160 may track the price of the commodity or valuable asset (step 220) and increases or decreases the value of the virtual funds (step 225) held in the user account based on the price of the commodity, such as the price for gold. The price of the commodity may be daily, multiple times daily, or at another interval. The tracking process is repeated for each user account and for the virtual funds held therein.

Figure 3:
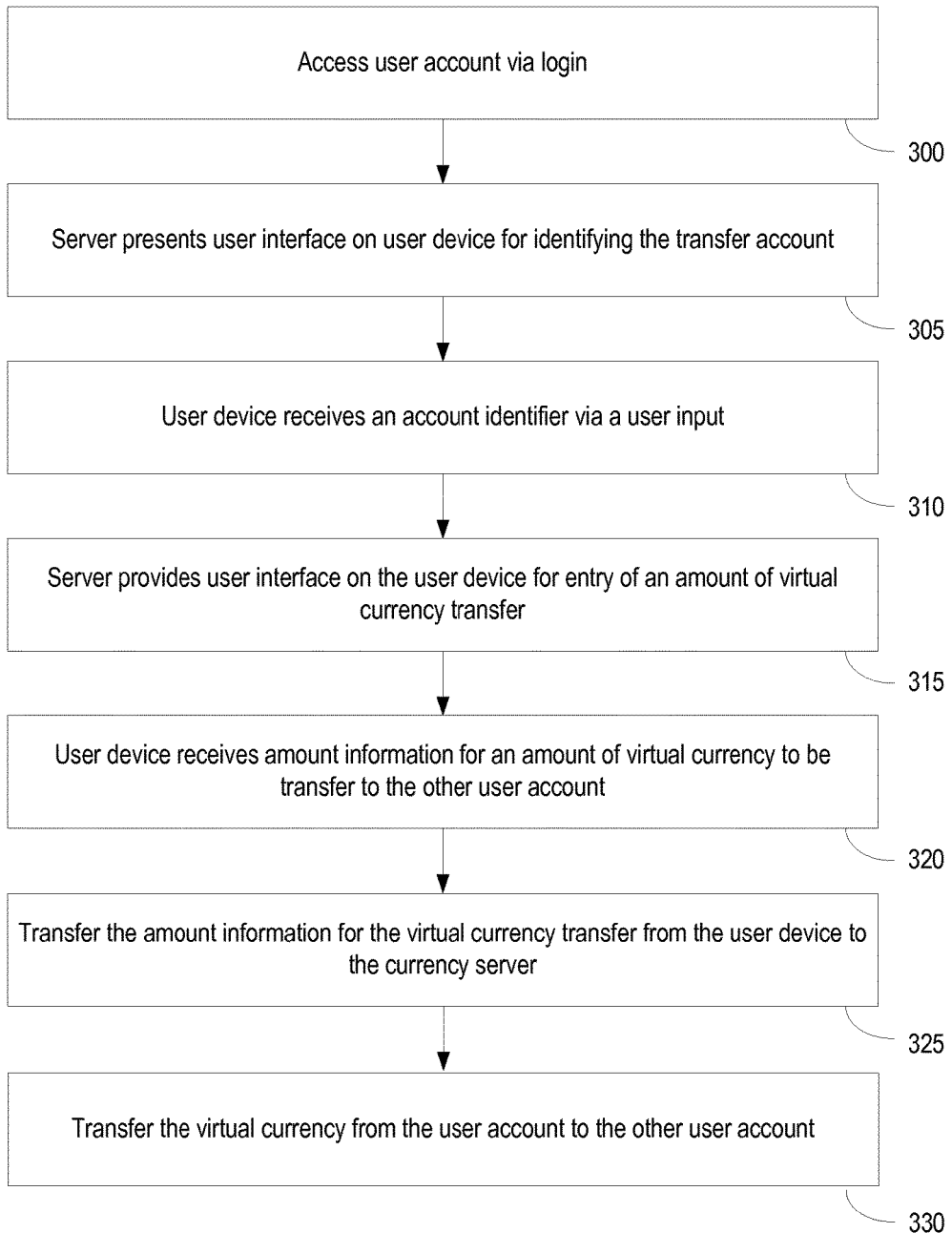
FIG. 3 is a high-level flow diagram of a method for transferring virtual currency from a first user account to a second user accounts for making a purchase or other transaction.

FIG. 3 is a high-level flow diagram of a method for transferring virtual currency from a first user account to a second user accounts for making a purchase or other transaction. The high-level flow diagram represents an example embodiment, and the high-level flow diagram is not limiting on the claims. Alternative embodiments may include more or fewer steps, or may include combined steps.

According to the embodiment, at an initial step 300, a user may login to her user account via (e.g., user account 192*a*) her user device 102. The user device may provide a user interface via a web page provided by the currency server or a computer program or application that operates on the user device. The remainder of the description related to FIG. 3 describes the currency server providing user interfaces via web pages to the user device, but the user interfaces may be presented on the user device via other software methods. After the currency server receives the user's login credentials from the user device, the currency server can present a user interface via a web page on the user device for actions that the user can take via her user device, step 305.

Subsequent to login, the currency server may provide a web page on the user device that prompt the user to enter an identifier into her user devices that identifies a second user account (e.g., user account 192*b*) into which virtual funds are to be transferred, step 310.

Subsequent to the user device receiving the user input that identifies the second user account, the currency server may provide subsequent web pages to the user device for prompting the user to enter an amount of virtual currency that is to be transferred to the second user account, step 315. The user can then enter amount information for transfer into the user device based on the prompt provided by the displayed webpage. After the user device receives the amount information for the transfer (step 320), the user device then transfers the amount information to the currency server, step 325.

Thereafter, the currency server transfers the virtual currency from the user account (e.g., user account 192*a*) to the second user account (e.g., user account 192*b*), step 330. The currency server might be configured to have notifications (e-mail, SMS, or messages having other message formats) sent to various communication accounts (e.g., e-mail account or other account) for the owners of these user accounts where the notifications provide information for the transfer.

According to one embodiment, the currency server thereafter generates an entry for the virtual currency transfer into an electronic ledger that the currency server may store. The electronic ledger can be a public ledger or a private ledger. The electronic ledger may store the virtual currency balance for each of the user accounts, and may store information for the transfer of virtual currency between the user accounts. The electronic ledger may also store information for deposits of legal tender in to user accounts, withdraws of virtual currency into legal tender, the purchase and sale of commodities that back virtual currency, or other information.

In some embodiments, the currency server is configured to transfer legal tender (e.g., US dollars, Canadian dollars, or other legal currency) from a user account holding virtual currency to other user accounts managed by currency severs of other organizations (e.g., banks, brokerage accounts, or the like), or the like. Prior to the transfer of legal tender, the currency server determines the value of the virtual currency in the legal tender based on the value of the commodity (e.g., gold) that backs the virtual currency.

Thereafter, the currency server may sell an amount of the commodity that has a value substantially equal to the amount of the virtual currency transferred out of the user's account. A commodity sale may occur each time virtual currency is transferred into legal tender or when legal tender is transferred out of virtual currency computing system 100. Alternatively, commodity sales may be aggregated for a number of transfers of legal tender out of the virtual currency computing system. The virtual currency computing system might also be configured to sell the commodity at a later date in an attempt to make a profit from the sale of the commodity.

The virtual currency transfer may be made for a variety of transactional purposes, such as for transferring funds to a family member, a friend, a business, a government entity, or the like.

The first user transferring virtual currency out of her user account and the second user receiving either virtual funds, or legal tender might be private parties (e.g., not merchants), or one or both of the first and the second users might be merchants. Alternatively, one or both of the first and the second users might be government entities. Transfer of virtual currency to a business via a network merchant system 170 is described immediately below.

In one embodiment, a first user having a first user account 192*a* may direct currency server 160 via her user device 102 to transfer virtual currency from her first user account to a second user account 192*b* of a second user for the purchase of good or services. The purchase and transfer of virtual currency may be transacted via web pages provided by the currency server, or by a computer program or application stored and operating on the user device.

For example, each user may use her user device 102 to access network merchant system 170 via web pages served by the currency server or served by the network merchant system. The web pages and transacted information may be transmitted via network 180.

The network merchant system 170 may include the Internet and one or more intranets and can include a business computer (e.g., business server) that hosts a website for a business that sells goods or services via the network merchant system. The business computers might provide for the acceptance of virtual currency from a user account for the purchase of goods or services. For example, a business computer might provide a webpage (e.g., a "checkout" page) that indicates that the business computer accepts virtual currency for payment of goods or services. The transfer of the virtual currency however may be between the user's user account on the currency server and the merchant's user account on the currency server.

In one embodiment, the network merchant system might include a private network of business computers that requires access to the private network for purchasing goods or services. A user computer might access the network merchant system by providing a user's login credentials for the user's user account to the currency server or to the network merchant system or both. One advantage of providing that the network merchant system includes a private network of businesses is that each business on the network merchant system can be required to accept virtual currency from the currency server for goods or services. In this way, a user will not have to use her user device to search the Internet to specifically locate business websites that accept virtual currency from the currency server. Any business that has a user computer on the network merchant system will be known to accept the virtual currency, and a user will not have to interrogate the businesses website in an attempt to determine whether the business accepts the virtual currency.

According to one embodiment, when a purchase is made via network merchant system 170, the network merchant system may collect virtual currency from the user's user account into the network merchant system's user account (i.e., a merchant's user account) hosted by the currency server, or the transaction may be a peer-to-peer type communication and transaction where the user and the merchant maintain their user accounts on their own user devices, or one of the user and the merchant may maintain their user account on their own user device while the other maintains their user account on the currency server. Transfer of the virtual currency may be controlled by the user who provides currency server 160 with one or more credentials (e.g., a password or the like) via her user device for authorizing the virtual currency transfer from her user account to the merchant's user account.

According to one embodiment, currency server 160 may charge a debit to the user's user account, the merchant's user account, or both for the transfer of virtual currency between these user accounts. For example, each time one of the user accounts is accessed by a user for making a purchase of good or services from network merchant system 170, currency server 160 may charge a debit to the user account, the merchant account, or both for the purchase. The amount of the debit may be based on a percentage of the sale price of the goods and services. Alternatively, the amount of the debit may be a flat fee. The amount of the flat fee may be based on a variety of considerations, such as the amount of funds held by a user account, a merchant account, or both, the number of transactions performed within a given period, or the like. For example, larger numbers of purchases may result in the flat fee being relatively small (e.g., 1 percent or less of the purchase price), and fewer numbers of purchases may result in the flat fee being relatively larger (e.g., 2 percent or less of the purchase price).

Currency server 160 may also charge a debit to one or more user accounts for a virtual currency transfer between the user accounts where no purchase of goods or services is performed. Currency server 160 might also be configured to charge a debit to a user account for the deposit of funds into the user account, might charge a debit for purchasing commodities or other valuable assets that back the funds, or both.

According to one embodiment, a value of the user's virtual currency and the purchasing power of the virtual currency is increased or decreased based on the price of the commodity that backs the funds. For example, if the user's user account is backed by gold, and the price for gold increases, then the value of the virtual currency in the user account also increases. The virtual currency may have more buying power with this increase in value of the user's virtual currency. Alternatively, if the price for gold decreases, then the value of the virtual currency in the user account is also decreased, and the virtual currency may have less buying power.

According to one embodiment, virtual currency held in the user accounts may be indexed. That is, a number of credits of the virtual currency held in a user account might not increase although the value of the credits increases, and the number of the credits might not decrease although the value of the credits decreases. For example, a user account might have one hundred initial credits of virtual currency that are each valued at one dollar. If the value of the commodity (e.g., gold bullion) that backs the virtual currency increases, then the user account might still have one hundred credits of virtual currency, but the value of each credit will be greater than one dollar. Alternatively, if the value of the commodity decreases, then the user account might still have one hundred credits, but the value of each credit will be less than one dollar.

In one embodiment, the virtual currency held in the user accounts is not indexed. That is the number of credits of virtual currency in a user account may increase or decrease as the value of commodity that backs the virtual currency increases or decreases.

According to one embodiment, the currency server is configured to transfer legal tender from a user's user account 192 to another user account, such as a bank account or the like. For example, the currency server may provide a user options for requesting that legal tender be transferred (e.g., electronically, via electronic check, or the like) the user's other account (e.g., back account). The currency server may serve a webpage to the user's user device were the webpage provides one or more user selectable options (commodity transfer, legal tender transfer, or other transfer) for having the value of the user's virtual currency returned to them. The user computer may be allowed to access the webpage if the user computer is logged into the user's accounts. In some embodiment, the webpage provides an option for allowing a user to select whether the user would like the value of all their virtual currency provided to them or a portion of their virtual currency provided. The currency sever may also be configured to provide a user option for allowing a user via the user's user device to collect the commodity that backs the virtual currency in the user's user account.

According to another embodiment, a commodity may be registered with the currency server and an amount of virtual currency equal to the value of the commodity may be deposited in a user's user account by the currency server. Registering a commodity with the currency server may be provided via a variety of methods. For example, according to some embodiments, the commodity may be deposited in a trust account of a commodity holding company. The currency serve may issue virtual currency to a user account subsequent to the deposit with the holding company.

The holding company may be configured to hold physical commodities or hold electronic commodities (e.g., electronic representations of stock certificates). In some embodiment, the currency server may be configured to accept the receipt of electronic commodities, into a trust account over network 180 from a user device, and issue virtual currency to a depositing user's user account subsequent to the deposit. The currency server may be configured to deny the registration of various commodities, for example, based on the origin of the commodities. For example, commodity registration with the currency server may be denied for gold or diamonds from sources (e.g., countries) known to be using mined gold or diamonds to fund a war or other conflict, commodities that are known to be man made versus commodities that are not man made, commodities that are known to be collected from space, or other sources.

In some embodiments, the virtual currency in the user accounts is encrypted virtual currency and is generated by an encryption process. The currency server, the user devices, or other computer systems (e.g., third party computer systems) may generate the virtual currency according to an encryption algorithm using a private and public key system or other type of encryption process. When the encrypted virtual currency is transferred between user accounts either with the currency server operating as a central server for the transfer or with the user devices operating in a peer-to-peer configuration, the encrypted virtual currency may be decrypted by the computer system receiving the encrypted virtual currency so that the decrypted virtual currency can be authenticated at being valid.

A third party computer system may be operated by a third party user and via a network, such as network 180, may collect encryption software from a creator or distributor of the encryption software for generating the encrypted virtual currency. After the encrypted virtual currency is generated it may be entered into a ledger for available encrypted virtual currency that may be sold to a user of a user account via the user's user device. In some embodiments, the one or more ledgers that store information for the generation of the virtual currency (e.g., encrypted virtual currency), the transactions between user accounts, the legal tender deposits to the user accounts, the legal tender withdraws from the user accounts, and other information stored in the ledgers as descried above is stored and updated by one or more third party computer systems where the ledger may be a public ledger that is available for public inspection. In some embodiments, the one or more ledgers are stored and updated by the currency server, or a combination of the currency server and a third party computer system.

In some embodiment, the encrypted virtual currency is an encrypted virtual currency that is generated by an existing virtual currency system, such as the Bitcoin™ network. The Bitcoin network is a well known computer network system that is well know to those of skill in the art and will not be described in detail herein. The currency server, the user devices, or both may be configured to communicate with the Bitcoin network via network 180 for purchasing Bitcoins and selling Bitcoins. Subsequent to the acquisition of existing virtual currency (e.g., Bitcoins) by the currency server or the user accounts of the user, the existing virtual currency may be backed by a commodity as described herein.

According to some embodiments, the virtual currency described herein may be used in a ripple computer system, which may be, or may include the virtual currency computing system 100. In the ripple computer system, credits and debts ripple between user accounts 192 in the ripple computer system. For example, a first user via her first user device may transfer virtual currency from her first user account to a second user's user account. The transfer of the virtual currency may be a transfer of credit in the form of the virtual currency where the second user is in debt to the first user to pay the credit back to the first user. The debt may be paid back via a variety of methods. For example, the debt may be paid back via the transfer of virtual currency back from the second user account to the first user account (via the currency server or in a peer-to-peer transfer), may be transferred via legal tender, may be transferred via other payment system, such as credit card, another credit system, such as an on-line credit system, such as PayPal™ of EBay Inc. of San Jose Calif. The virtual currency in the second user account may be transferred to one or more other user accounts (e.g., a third user account) as a credits where the user of the third user account, for example, owes a dept to the second user. This system of credits and debits may continue to be transferred, and the credit and debit are said to ripple through the virtual currency computing system 100.

In the ripple computer system, the users might have existing relationships via social media or otherwise so that trust exists between the users prior to credits being issued in the form of virtual currency. For example, the first user and the second user might have a first connection through social media, and the second and third user might have a connection through social media. The first and third uses may or may not have a connection through social media, but the second user might be obligated to repay the first user, if the third user who might owe a debt to the first user (e.g., in the above example) does not pay the first user.

In the ripple computer system, the virtual currency may be encrypted virtual currency. Transfers of virtual currency between user accounts may be transferred via encrypted communications that may be sent via e-mail, that may be second via a proprietary application that operates on the user's user devices, on the currency server, third party computer system, or the like, via social media links, such as social media links provided by a social media application or social media websites, such as those social media links provided by Google™, Facebook™, or other social media links, such as provided by a proprietary social media application configured for use to transfer virtual currency in the ripple computer system.

The currency server, the user computers, or one or more third party computer systems may store and update one or more ledgers for the initial credit and dept, and may track the new owners of the dept as the virtual currency from the initial credit is transferred from the first user account to the second user account might be transferred subsequently to other user accounts.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computerized method for managing a user account, the method comprising:

receiving, by a currency computer system, a transfer of first funds into a user account, wherein the first funds have a first value;

purchasing, by the currency computer system, a commodity or a valuable asset to back the first funds from a commodity exchange computer system, wherein the commodity or asset has a second value, and the first and second values are the same;

using an encryption engine, encrypting virtual currency to generate encrypted virtual currency;

entering the encrypted virtual currency into a public ledger database, wherein the public ledger database is publically accessible;

transforming, by the currency computer system, the first funds into virtual funds based on the second value the commodity or asset purchased from the commodity exchange computer system by the currency computer system, wherein the virtual funds are at least a portion of the encrypted virtual currency;

entering, by the currency computer system, the second value for the virtual funds into the user account based on the commodity or asset purchased from the commodity exchange computer system by the currency computer system;

entering, by the currency computer system, the second value for the virtual funds held in the user account in the public ledger database, which is adapted for public inspection;

tracking, in an repeating manner by the currency computer system, a third value of the commodity or asset purchased from the commodity exchange computer system by the currency computer system;

calculating in a repeating manner by the currency computer system, a difference between the third value and the second value;

increasing or decreasing the second value of the virtual funds by the difference, in a repeating manner by the currency computer system, based on the value of the commodity or asset being the third value when tracked by the currency computer system, wherein the user account is accessible by the currency computer system, for making purchases or an additional transfer of the virtual funds to another user account;

receiving, by the currency computer system, a request to transform the virtual funds in the user account into second funds in the user account on a first date;

decrypting the virtual funds;

verifying the authenticity of the virtual funds as authentic, subsequent to and based on decrypting the virtual funds;

entering, by the currency computer system, a fourth value for the second fund into the user account based on a sale value of the commodity or asset on the first date;

entering a deduction for the fourth value of the virtual funds held in the user account from the public ledger database; and selling, by the currency computer system, the commodity or asset on a second date to generate a fifth value for third funds, wherein the fourth and fifth values are different values and the first and second dates are different dates.

2. The method of claim 1 wherein the commodity is gold, silver, or platinum.

3. The method of claim 2 wherein the commodity is gold bullion, silver bullion, or platinum bullion.

4. The method of claim 1 wherein the valuable asset is a stock or a bond.

5. The method of claim 1 wherein the fifth value is greater than the fourth value.

6. The method of claim 5 wherein the first and second funds are indexed in the user account by the currency computer system.

7. The method of claim 1 wherein the other user account is a merchant account of a merchant.

8. A non-transitory computer-readable storage medium comprising instructions for managing funds in a user account, wherein the instructions, when executed, are for controlling a computing device to be configured for:

receiving, by a currency computer system, a transfer of first funds into a user account, wherein the first funds have a first value;

purchasing, by the currency computer system, a commodity or a valuable asset to back the first funds from a commodity exchange computer system, wherein the commodity or asset has a second value, and the first and second values are the same;

using an encryption engine, encrypting virtual currency to generate encrypted virtual currency;

entering the encrypted virtual currency into a public ledger database, wherein the public ledger database is publically accessible;

transforming, by the currency computer system, the first funds into virtual funds based on the second value the commodity or asset purchased from the commodity exchange computer system by the currency computer system, wherein the virtual funds are at least a portion of the encrypted virtual currency;

entering, by the currency computer system, the second value for the virtual funds into the user account based on the commodity or asset purchased from the commodity exchange computer system by the currency computer system;

entering the second value for the virtual funds held in the user account in the public ledger database;

tracking, in a repeating manner by the currency computer system, a third value of the commodity or asset purchased from the commodity exchange computer system by the currency computer system;

calculating in a repeating manner by the currency computer system, a difference between the third value and the second value;

increasing or decreasing the second value of the virtual funds by the difference, in a repeating manner by the currency computer system, based on the value of the commodity or asset being the third value when tracked by the currency computer system, wherein the user account is accessible by the currency computer system, for making purchases or an additional transfer of the virtual funds to another user account;

receiving, by the currency computer system, a request to transform the virtual funds in the user account into second funds in the user account on a first date;

decrypting the virtual funds;

verifying the authenticity of the virtual funds as authentic, subsequent to and based on decrypting the virtual funds;

entering, by the currency computer system, a fourth value for the second fund into the user account based on a sale value of the commodity or asset on the first date;

entering a deduction for the fourth value of the virtual funds held in the user account from the public ledger database; and selling, by the currency computer system, the commodity or asset on a second date to generate a fifth value for third funds, wherein the fourth and fifth values are different values and the first and second dates are different dates.

9. The non-transitory computer-readable storage medium of claim 8 wherein the commodity is gold, silver, or platinum.

10. The non-transitory computer-readable storage medium of claim 9 wherein the commodity is gold bullion, silver bullion, or platinum bullion.

11. The non-transitory computer-readable storage medium of claim 8 wherein the valuable asset is a stock or a bond.

12. The non-transitory computer-readable storage medium of claim 8 wherein the fifth value is greater than the fourth value.

13. The non-transitory computer-readable storage medium of claim 12 wherein the funds are indexed in the user account by the currency computer system.

14. The non-transitory computer-readable storage medium of claim 8 wherein the other user account is a merchant account of a merchant.

15. A computing system for managing a user account, the computing system comprising:
- a processor; and
- a computer-readable storage medium comprises instructions for controlling the processor to be configured for:
- receiving, by the computing system, a transfer of first funds into a user account, wherein the first funds have a first value;
- purchasing, by the computing system, a commodity or £! valuable asset to back the first funds from a commodity exchange computer system, wherein the commodity or asset has a second value, and the first and second values are the same;
- using an encryption engine of the computing system, encrypting virtual currency to generate encrypted virtual currency;
- entering, by the computing system, the encrypted virtual currency into a public ledger database, wherein the public ledger database is publically accessible;
- transforming, by the computing system, the first funds into virtual funds based on the second value the commodity or asset purchased from the commodity exchange computer system by the currency computer system, wherein the virtual funds are at least a portion of the encrypted virtual currency;
- entering, by the computing system, the second value for the virtual funds into the user account based on the commodity or asset purchased from the commodity exchange computer system by the currency computer system;
- entering, by the computing system, the second value for the virtual funds held in the user account in the public ledger database;
- tracking, in a repeating manner by the computing system, a third value of the commodity or asset purchased from the commodity exchange computer system by the currency computer system;
- calculating in a repeating manner by the currency computer system, a difference between the third value and the second value;
- increasing or decreasing the second value of the virtual funds by the difference, in a repeating manner by the computing system, based on the value of the commodity or asset being the third value when tracked by the computing system, wherein the user account is accessible by the computing system, for making purchases or an additional transfer of the virtual funds to another user account;
- receiving, by the computing system, a request to transform the virtual funds in the user account into second funds in the user account on a first date;
- decrypting, by the computing system, the virtual funds;
- verifying, by the computing system, the authenticity of the virtual funds as authentic, subsequent to and based on decrypting the virtual funds by the computing system;
- entering, by the computing system, a fourth value for the second fund into the user account based on a sale value of the commodity or asset on the first date; and
- entering, by the computing system, a deduction for the fourth value of the virtual funds held in the user account from the public ledger database;
- selling, by the computing system, the commodity or asset on a second date to generate a fifth value for third funds, wherein the fourth and fifth values are different values and the first and second dates are different dates.

16. The computing system of claim 15 wherein the commodity is gold, silver, or platinum.

17. The computing system of claim 16 wherein the commodity is gold bullion, silver bullion, or platinum bullion.

18. The computing system of claim 15 wherein the fifth value is greater than the fourth value.

19. The computing system of claim 15 wherein the funds are indexed in the user account by the computing device.

20. The computing system of claim 15 wherein the other user account is a merchant account of a merchant.

21. The method of claim 1 wherein the first, second, and third funds are the same type of funds.

22. The method of claim 1 wherein selling the commodity or asset comprises selling, in aggregate by the computing system, the commodity or asset in combination with second commodities or second assets of at least a second user account so as to generate a profit from the user account and the second user account in aggregation in a single sale event.

23. The method of claim 22 comprising storing the user account in an encrypted format in a ledger, wherein the ledger is a public ledger database available for public inspection, the ledger is stored and updated by one or more third party computer systems, stores information for the generation of the encrypted funds, and the ledger stores transactions of the user account.

* * * * *